3,399,148
PLATINUM REFORMING CATALYST
Malden Ward Michael, Stamford, Conn., and Robert Matthew Debaun, Wayne, N.J., assignors to American Cyanamid Company, Stamford, Conn., a corporation of Maine
No Drawing. Filed Mar. 18, 1966, Ser. No. 535,329
6 Claims. (Cl. 252—463)

ABSTRACT OF THE DISCLOSURE

Process for preparing an alumina support for catalysts comprising acid leaching below about 29° C., and process for using a catalyst having such an alumina support.

---

This invention relates to a method of obtaining an alumina-base or alumina-containing-base activated alumina catalyst by the modification of conventional acid-leaching processes such as those typically disclosed in U.S. Patent 3,032,512 and U.S. Patent 3,038,865. The invention also relates to the catalysts obtained by the process of this invention. Although the invention is discussed with reference to petroleum hydrocarbon reforming catalyst of the type now used commercially for hydroforming petroleum fractions boiling in the gasoline range or for aromatizing naphthas, it will be understood that the novel catalyst carriers or supports herein described can also be used to prepare a wide variety of other catalysts exhibiting the important advantages of the present invention.

As is generally known, a wide variety of catalysts are now employed in commercial use in which an activating metal or metal oxide is supported on or impregnated in and/or throughout an alumina base. This invention also relates to the preferred acid-leached platinum alumina hydrocarbon reforming catalysts.

The catalytic reforming of hydrocarbon mixture such as volatile petroleum fractions is ordinarily carried out by passing a mixture of hydrocarbons with hydrogen over a solid catalyst at a temperature above about 400° C., and usually at superatmospheric pressures. Various types of active catalytic materials for this reaction are known, including the oxides or sulfides of molybdenum, tungsten and vanadium and the group 8 elements, particularly the noble metals such as platinum and palladium. A well known type of reforming catalysts comprises 0.1% to 1.0% of platinum and 0.1% to 8.0% of a halogen such as chlorine or fluorine supported by active alumina. It is known that the activity and selectivity of this type of catalyst can be varied within certain limits by varying the platinum and the halogen contents. It is well known that the catalytic reforming of volatile petroleum hydrocarbons in the presence of hydrogen, which is frequently called hydroforming, is a complex procedure. When petroleum hydrocarbon fractions such as those falling the gasoline range, particularly between about 200° F. and 425° F., are mixed with hydrogen and passed over a platinum alumina catalyst at temperatures of about 600° F. to about 1100° F., and at pressures of about 50 to about 500 lbs. per sq./inch or more, their fuel value in an internal combustion engine is materially improved. Platinum catalysts, in general, are used by the petroleum industry to upgrade virgin naphthas for the production of motor fuels and for the production of aromatic hydrocarbons. A usually preferred naphtha is a 200° F. to 450° F. cut of Mid-Continent crude. Also naphthas from other crudes such as Texas, California, or Kuwait may be used. Mid-Continent crudes are quite plentiful, and contain a large amount of naphthenes, as for example, about 40%. These naphthenes are convertible to corresponding aromatics by dehydrogenation under reforming conditions. Other reactions which normally take place in reforming are hydrocracking of paraffins, isomerization of paraffins, and dehydrocyclization of paraffins to aromatics. In a typical reforming run, a Mid-Continent crude naphtha having an unleaded Research octane rating of 35–40 units is convertible to a motor fuel which has an octane rating of 85–100 units. This is due to a number of reactions which take place simultaneously including an isomerization reaction in which more highly branched-chain paraffins are formed, dehydrocyclization and aromatization reactions, and also a hydrocracking reaction.

It has been known for some years that the activity o fthe platinized alumina catalyst for this process, as determined by the standard 200 lbs. per sq./inch naphtha reforming catalyst can be increased by combining additional halogen with the alumina. It is also known, however, that the added halogen increases the extent of hydrocracking, and therefore too much halogen in the catalyst is frequently undesirable. It is therefore highly desirable to obtain a process which is independnt of, or may be used jointly with halogen control.

It is an object of this invention to obtain a method of producing alumina catalyst supports, and catalysts derived therefrom, which have increased activity for hydroforming.

Another object is to obtain an activated alumina which when used as a support for a reforming catalyst of the type described above obtains a supported catalyst having excellent activities even with low contents of the active coating or impregnating catalytic material(s).

An additional object is to provide methods for gasoline manufacture employing modified and improved alumina and catalyst prepared therefrom.

Additional objects and advantages will become apparent from the detailed description of the present invention set forth herein below, including the specific examples therein.

The objects of this invention are obtained by activating alumina by acid-leaching of alumina-containing material, preferably substantially solely alumina, at a beginning (initial) leaching temperature and an over-all average leaching temperatures below about 29° C., preferably from about 5° C. to about 15° C., respectively. The acid employed is an inorganic acid, preferably a non-halogen acid, such as the preferred nitric acid. However, the novel low-temperature acid-leach of this invention may be incorporated as a modification to processes such as those disclosed in the above-referred-to U.S. Patent Nos. 3,032,-512 and 3,038,865, as well as other conventional acid leaching processes.

Most, if not all, platinum reforming catalysts are employed in fixed bed operations where they are in the form of pills, pellets, or beads. In preparing such catalysts, in accordance with the process of this invention, a suitable alumina may be first formed into pieces of suitable size and shape such as cylindrical pellets, spherical beads, and the like. Although alumina from any source may be employed, it is preferred to use either a sol-type alumina, prepared by gelling and drying an aqueous sol such as is typically disclosed in Reissue Patent No. 22,196 and U.S. Patents Nos. 2,404,024, and 2,408,724, or precipitated alumina obtained by neutralizing an aqueous alkali metal aluminate or aluminum salt solution followed by washing and drying the resulting aluminum hydroxide. Alumina from these sources is preferred because it produces gamma-alumina when calcined at temperatures within the range 1000° F. to about 1500° F., but it will be understood that the principles of this invention may be applied to alumina of other types also.

The aluminum may be dried by any convenient method, or may be spray dried as in the preferred embodiment.

As indicated above, one important preferred feature of this invention resides in the use of aqueous nitric acid as the leaching acid while employing a beginning (initial) leaching temperature and average leaching temperatures below about 29° F., preferably an average of about 5° C. to about 15° C., for about 45–60 minutes, or at least until the major amount of the acid has reacted. The broad process, or the preferred embodiment employing aqueous nitric acid, may additionally employ hydrochloric acid or other halogen acid in admixture, to impart a control content of combined halogen to the leached alumina. If hydrochloric or hydrofluoric acid is employed as a portion of the leaching agent, the alumina retains a substantial content of chloride or fluoride ions, whereas if a non-halogen acid is employed, the acid-absorbing cites in the alumina are occupied thereby and do not readily combine with halogen. Nitric acid presents a great advantage over other non-halogen inorganic acids, such as sulfuric or phosphoric acid for example, in that its aluminum salt decomposes to aluminum oxide upon subsequent heating without leaving a solid residue in the catalyst. Therefore, since the low-temperature acid-leaching improvement of this invention makes possible a high activity without resorting to the inclusion of halogens, the preferred embodiment employs a non-halogen acid.

Although most of the improvement in activity resulting from acid-leaching is obtained when the first about 2% to about 3% alumina has been removed from the catalyst pellets (or other forms), further leaching is preferred to the extent that from about 2% to about 15% of alumina is removed, at which time normally most of the acid will have reacted. A typical acid-leaching for purposes of this invention employs about 0.6 mole of acid per mole of alumina, and about 3 weights of acid solution per weight of alumina, for example. For more detailed disclosure on the nature of acid-alumina ratios, see for example U.S. Patent No. 3,032,512, column 2, lines 18 through 27. The leaching is preferably carried out by contacting the carrier pieces with the inorganic acid, preferably nitric acid, having a concentration within the range normally of about 0.5 normal to 5 normal. The quantity of acid should be sufficient to convert the desired portion of aluminum into salt of the acid employed, sufficient to saturate the surface of the active alumina with cite-occupying ions, and sufficient to provide for a slight excess of the leaching acid.

After the alumina has been leached to the extent above indicated it is washed with water or aqueous ammonia, for example, to remove aluminum salts and excess acid. Completion of the washing can be conveniently followed by measuring the pH of the wash water after it has contacted the leached alumina. Ordinarily the washing is complete when the pH of the wash water is 4.6 or slightly higher. The alumina is then oven dried at about 200°–300° F. and may be calcined at 1000°–1400° F. or higher for about one hour. The residual halogen content of alumina leached with a halogen acid can be controlled to some extent by regulating the calcination temperature within this range since higher temperatures tend to reduce the content of residual chlorine or fluorine, but the hydrochloric or hydrofluoric acid is evolved only at high temperatures within the calcination range and therefore creates a serious corrosion problem. When the halogen acid is mixed with nitric acid, however, the hydrogen halide is given off along with oxides of nitrogen at a much lower temperature; in fact, much of it is removed when the leached and washed alumina is oven-dried at 250°–300° F. or slightly higher.

The acid-leached alumina of this invention may be impregnated either before or after the post-leaching calcination.

The shaped alumina pieces, after a first calcination at 1000° F. to about 1500° F. and after the leaching with an aqueous acid to increase the activity of the finished catalyst, are then typically impregnated with an aqueous chloroplatinic acid solution.

The acid-leached alumina particles of this invention may be impregnated with typically a suitable platinum compound either from aqueous or other solvent solution of such a compound, by spraying of the platinum compound thereon, emersion of the spray-dried alumina in the solution or by any other means whereby reasonably even and uniform distribution of the catalytic agent on the base may be insured. With respect to platinum, chloroplatinic acid, bromoplatinic acid, platinum tetrachloride, platinum dichloride or other soluble sources of platinum may be employed. These materials or their equivalents are employed in such amounts as to impregnate the base with from between about 0.03% up to about 1% of platinum, based on the final weight of the catalyst composition. More preferable amounts of from between about 0.08% and 0.8% are employed.

Alternatively, instead of coating and/or impregnating before the calcination, the leached alumina particles may be typically impregnated with platinum after drying and calcination, such as by soaking in or spraying with an aqueous solution of chloroplatinic acid ($H_2PtCl_6$).

Also, a penetrant or penetration aid may advantageously be employed to assist thorough impregnation of the alumina by the platinum and/or other conventional impregnants. Typical conventional penetrants include such acids as nitric and hydrochloric and such acidic salts as aluminum nitrate and aluminum chloride.

Impregnation with typically a platinum or palladium solution may be followed by treatment with hydrogen sulfide, ammonium sulfide, or other precipitant.

If desired, as indicated above, the low-temperature acid-leaching of this invention may be employed as a part of processes employing halogen acids in whole or in part, to further increase the activity of the final catalyst.

The invention will be further described and illustrated by the following specific examples which are intended to limit this invention only insofar as the appended claims are limited.

Example I

In this example, during the leaching of alumina with nitric acid, the temperature was taken at intervals as indicated in Table I below, and the average temperature computed therefrom.

TABLE I

Strength of acid used—About 11.5% $HNO^3$.
Time of leach—One hour.
Alumina removed—6–7%.
Exotherm and control—Acid solution in beaker in ice. Alumina added at 10° C. At end of addition (1 minute) had gone to 24° C. Rest of time shown below.

| Time | Temp | Calculation |
|---|---|---|
| Initial, 10° C. | | 17.0° avg.× 1 min.*= 17.0° |
| After alumina (1 minute), 24° C. | | 18.5° avg.× 9 min.*=166.5° |
| 10 minutes, 13° C. | | 11.5° avg.×10 min.*=115.0° |
| 20 minutes, 10° C. | | 9.0° avg.×10 min.*= 90.0° |
| 30 minutes, 8° C. | | 7.0° avg.×10 min.*= 70.0° |
| 40 minutes, 6° C. | | 4.5° avg.×10 min.*= 45.0° |
| 50 minutes, 3° C. | | 3.0° avg.×10 min.*= 30.0° |
| End (60 minutes), 3° C. | | |

60 min.=533.5°

NOTE.—Approximate avg., ° C./min.=533.5/60=8.89° C.

*Time interval between temperature readings.

The above example typically illustrates the temperatures which may be expected during an acid leach within the scope of this invention.

Example II

Employing the standard 200 lbs. per sq./inch naphtha reforming test referred to above, the activity of separate catalysts, (1) one catalyst having a diameter of ⅛ inch and a length of ⅛ inch, and (2) a second catalyst having a diameter of ¹⁄₁₆ inch and a length of ³⁄₁₆ inch, were each divided into 3 portions. The first portion of each about 10° C., and the activity thereof was measured for each. The second portion of each was subjected to acid-leach at initial and average temperatures of about 35° C., and the activity of the catalysts of each were tested. The third portion of each was subjected to initial and average temperatures of about 55° C. and the activities of each catalyst were determined thereafter. The results of this example are shown in Table II.

TABLE II

| Particle Size (diameter×length) | Activity (resulting from "Starting and Avg." temperature of leach ° C.) | | |
|---|---|---|---|
| | 10° C. | 35° C. | 55° C. |
| ⅛×⅛ | 185 | 146 | 132 |
| 3/16×3/16 | 240 | 230 | 200 |

The above Example II illustrates the superior and high degree of activity obtained by the employment of initial and average temperatures of acid-leach below about 29° C.

Other suitable changes and variations may be made in carrying out the invention disclosed herein without departing from the spirit and scope thereof, as described in the foregoing disclosure and as defined in the appended claims.

We claim:
1. A process for producing activated alumina which comprises calcining said alumina at a temperature from about 1,000 to 1,500° F., and thereafter treating said alumina with a strong inorganic acid, with cooling to maintain an initial and average temperature of about 5 to 15° C., the acid strength and time of treatment being such that from about 2 to 15% of the alumina is leached out.

2. A process according to claim 1, in which said leaching is for a period of from about 30 minutes to about 60 minutes, and in which said acid is a non-halogen inorganic mineral acid.

3. A process according to claim 2, in which said acid comprises nitric acid in a major amount.

4. A process according to claim 3, including impregnating said activated alumina with a platinum composition.

5. A catalyst obtained by the process of claim 4.

6. A catalyst support obtained by the process of claim 1.

References Cited

UNITED STATES PATENTS

| 2,769,688 | 11/1956 | Milliken et al. | 23—143 |
| 3,038,865 | 6/1962 | Abrahams | 23—143 |
| 2,723,947 | 11/1955 | Oblad et al. | 208—138 |
| 2,751,333 | 6/1956 | Heinemann | 208—138 |
| 2,903,418 | 9/1959 | Kirshenbaum et al. | 208—138 |
| 2,914,488 | 11/1959 | Gilbert | 208—138 |
| 2,970,892 | 2/1961 | Kirshenbaum et al. | 208—138 |
| 2,992,985 | 7/1961 | Doumani et al. | 208—138 |

FOREIGN PATENTS 850,893   10/1960   Great Britain.

DELBERT E. GANTZ, *Primary Examiner.*

H. LEVINE, *Assistant Examiner.*

UNITED STATES PATENT OFFICE
CERTIFICATE OF CORRECTION

Patent No. 3,399,148                            August 27, 1968

Malden Ward Michael et al.

It is certified that error appears in the above identified patent and that said Letters Patent are hereby corrected as shown below:

Column 4, TABLE I, line 1 of the heading, "$HNO^3$" should read -- $HNO_3$ --. Column 5, line 1, after "each" insert -- was subjecte to initial and average temperatures of --.

Signed and sealed this 3rd day of March 1970.

(SEAL)
Attest:

Edward M. Fletcher, Jr.                          WILLIAM E. SCHUYLER, JR.
Attesting Officer                                          Commissioner of Patents